Aug. 15, 1950     D. W. BERRY     2,518,655
ENGINE LUBRICATION SYSTEM
Filed March 13, 1946
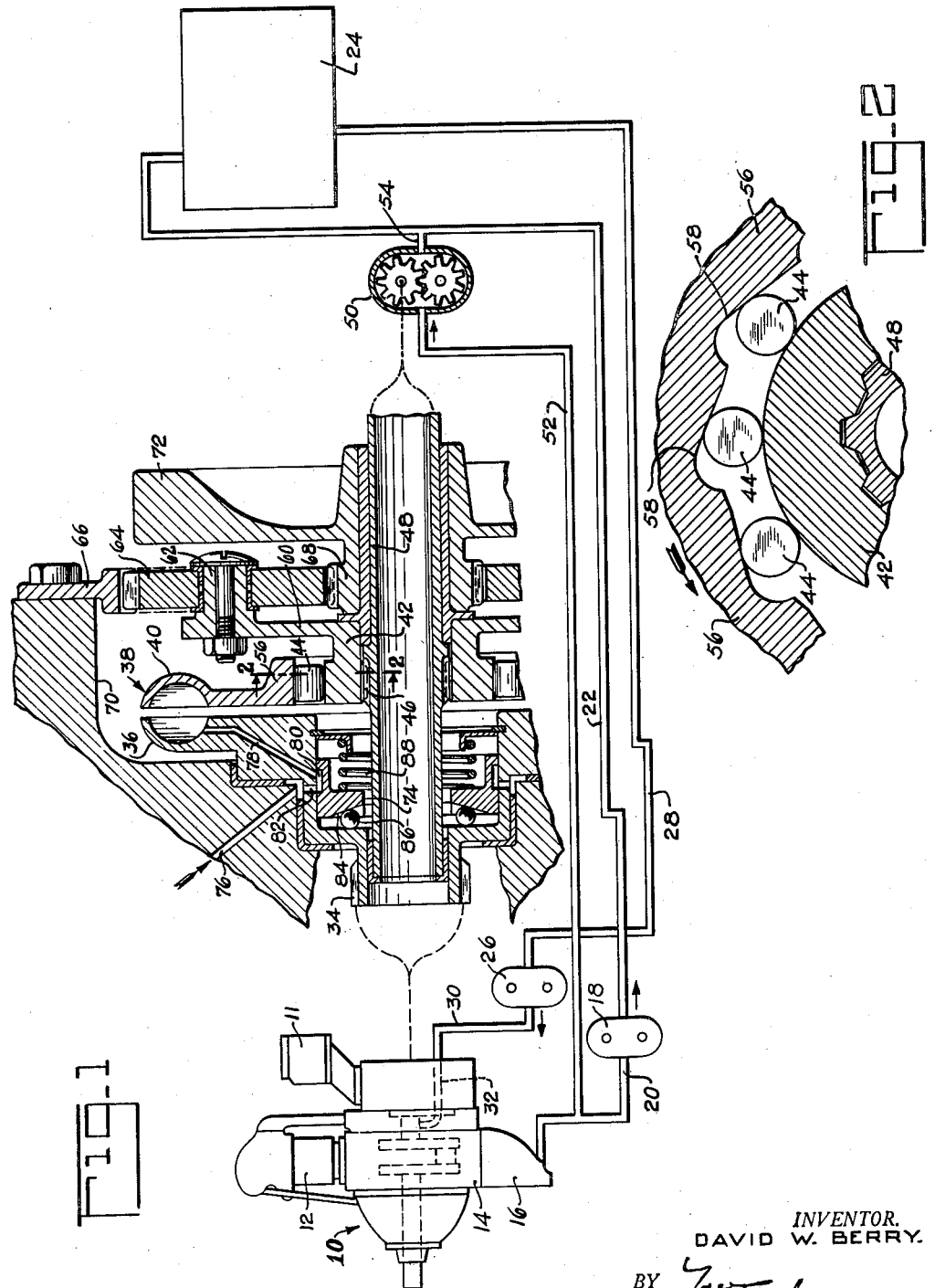
INVENTOR.
DAVID W. BERRY.
BY
ATTORNEY

Patented Aug. 15, 1950  2,518,655

UNITED STATES PATENT OFFICE 2,518,655

ENGINE LUBRICATION SYSTEM

David W. Berry, Ridgewood, N. J., assignor to Wright Aeronautical Corporation, a corporation of New York Application March 13, 1946, Serial No. 653,995

4 Claims. (Cl. 184—6)

This invention relates to engine lubrication systems and is particularly directed to means for operating an oil scavenge pump after the engine has stopped.

Engines having so-called dry-sump lubrication systems are generally provided with an engine driven scavenge pump for removing oil from the engine sump and returning the oil to a supply reservoir. However, during engine operation, a substantial amount of oil is being whirled around inside the engine and, when the engine stops, this oil gradually settles out into the engine sump. In the case of an engine having cylinders extending below the top of the engine sump, as in the case of conventional radial cylinder aircraft engines, there is danger, after the engine stops, of the oil settling into and overflowing the sump into these lower cylinders. The oil thus overflowing into the lower cylinders may leak past their pistons and result in damage to the engine when it is subsequently started. Accordingly, it is an object of this invention to provide novel means for removing oil from the engine sump after the engine has stopped.

Specifically, the invention comprises an energy storing flywheel driven from the engine in such a way that the flywheel continues to rotate for an appreciable length of time after the engine stops to drive a scavenge pump for removing oil from the engine sump.

Other objects of this invention will become apparent upon reading the annexed detailed description in connection with the drawing in which:

Figure 1 is a diagrammatic view of an engine lubrication system embodying the invention; and Figure 2 is a sectional view taken along line 2—2 of Figure 1.

Referring to the drawing, the numeral 10 indicates a conventional aircraft engine having a carburetor 11 and having a plurality of cylinders 12 radially disposed about the engine crankcase 14. A sump 16 is provided at the bottom side of the crankcase into which the engine lubricating oil drains. An engine driven scavenge pump 18 is provided with an inlet conduit 20 communicating with the bottom of the sump 16 and with an outlet conduit 22 communicating with the top of an oil supply reservoir 24. As illustrated, the shaft 48 is piloted within the engine driven shaft 34 for rotation relative thereto. In this way, the sump 18, when operating, draws lubricating oil from the engine sump 16 and returns the oil to the supply reservoir 24. A second engine driven pump 26 has an inlet conduit 28 communicating with the bottom of the reservoir 24 and an outlet conduit 30 communicating with various passages such as 32 within the engine. Thus, the pump 26, when operating, draws lubricating oil from the reservoir 24 and supplies oil under pressure to such engine passages as 32 for lubricating the various bearing surfaces of the engine. The structure so far described is quite conventional and comprises a so-called dry-sump lubrication system.

With the aforedescribed structure, after the engine stops, a substantial quantity of oil drains down into the engine sump. If the oil overflows the sump, it will run into the bottom cylinders (not shown) of the engine and, if this oil leaks past the pistons of these bottom cylinders, damage to the engine may result when the engine is subsequently started.

With the present invention, the engine is also drivably connected to a shaft 34 formed integral with a driving element 36 of a hydraulic coupling 38. The driven element 40 of the hydraulic coupling 38 is drivably connected to an intermediate shaft 42 through a one-way clutch comprising rollers 44. The shaft 42 is splined at 46 to a shaft 48 which is drivably connected to a pump 50. The pump 50 has an inlet conduit 52 communicating with the sump 16 around the pump 18 and an outlet conduit 54 communicating with the oil supply reservoir.

As seen in Figure 2, the hub 56 of the driven coupling element 40 is provided with a plurality of circumferentially spaced cam surfaces 58 facing an outer cylindrical surface on the shaft 42 and between which the rollers 44 are disposed. As illustrated in Figure 2, the cam surfaces 58 are such that the coupling member 40 can drive the shaft 42 counterclockwise but the shaft 42 can overrun the coupling element in this direction.

The shaft 42 is provided with a flange 60 having a plurality of studs 62 upon which planet pinions 64 are journaled. The pinions 64 are disposed in meshing engagement between a ring gear 66 and a sun gear 68. The ring gear 66 is secured to a fixed housing structure 70 and the sun gear 68 is drivably connected to or formed integral with a flywheel 72.

With this construction, during engine operation and when the coupling 38 is engaged—that is, when the working chamber of the coupling contains a suitable liquid—the pump 50 is driven from the engine through the hydraulic coupling 38, one-way clutch rollers 44 and shafts 42 and 48. The pump 50, when operating, helps to return oil from the sump 16 to the reservoir 24. The engine, when operating, also drives the flywheel 72 through the hydraulic coupling 38, one-way clutch rollers 44, shaft 42 and planet pinions 64 thereby storing kinetic energy in the flywheel. The pinions 64 provide a suitable step-up speed ratio drive to the flywheel thereby increasing the quantity of energy stored in the flywheel. When the engine is shut down, the flywheel continues to rotate for an appreciable length of time whereby the pump 50 continues to return oil from the sump 16 to the reservoir 24 during this length of time after the engine has stopped. During this operation of the pump 50, after the engine has stopped, the clutch rollers 44 permit the shaft 42 to overrun the coupling element 40 so that the flywheel can drive the pump 50 without also driving the engine 10.

The hydraulic coupling 38 has been provided in order that it is unnecessary to continually drive the high speed flywheel 72 during engine operation. To this end, a valve member 74 is provided for controlling the admission of a suitable liquid such as engine lubricating oil, from a passage 76 in the fixed structure 70 to a passage 78 communicating with the working chamber of the hydraulic coupling 38. The valve member 74 has an annular groove 80 which, in the position illustrated in Figure 1, straddles the passage 78 and a radial hole 82 communicating with the oil supply passage 76. Accordingly, in this position of the valve 74, oil is admitted to the working chamber of the hydraulic coupling 38.

The valve member 74 is provided with pockets 84 each having an inclined wall facing an annular shoulder on the shaft 30 and between which balls 86 are disposed. The arrangement is such that during engine operation the balls 86 rotate with the shaft 34 about its axis and when the engine speed reaches a predetermined value, the balls 86 move radially outward in their pockets 84 in response to the centrifugal force acting thereon, thereby moving the valve member 74 axially against a spring 88. This movement of the valve member 74 cuts off a supply of oil to the coupling whereupon the oil drains out of the coupling through the clearance between the outer edges of the coupling elements 36 and 40 thereby disengaging the coupling.

The design is such that when the engine speed exceeds some value above its idling speed, the valve 74 cuts off the supply of oil to the coupling thereby interrupting the drive from the engine to the flywheel 72 and the pump 50. In this way, the engine only drives the high speed flywheel 72 and the pump 50 during idling operation of the engine. Accordingly, the engine stores and maintains energy in the flywheel during engine idling operation before the engine is stopped. After the engine has stopped, the flywheel 72 drives the pump 50, as previously described.

With the above construction, the pump 50 is operated after the engine has stopped to remove oil from the engine sump 16 to the reservoir 24. In this way, danger of oil overflowing into the lower engine cylinders is minimized. Also, with the present invention, no power means, apart from the engine, is necessary for driving the pump after the engine has stopped. This is so, since during engine operation, the engine stores sufficient energy in the flywheel for operating the pump 50 for an appreciable length of time after the engine has stopped.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with an engine, an oil supply reservoir, a pump adapted to remove oil from the engine and feed said oil to said supply reservoir, an energy storing flywheel drivably connected to said pump, means providing a drive connection from said engine to said flywheel and pump such that said flywheel can drive said pump without also driving said engine, a hydraulic coupling in said drive connection, and means operative to shut off the supply of liquid to said coupling at high engine speeds.

2. In combination with an engine; a pump operable to remove oil from said engine; an energy storing flywheel drivably connected to said pump; means providing a drive connection from said engine to said flywheel such that said flywheel can drive said pump without also driving said engine; a hydraulic coupling in said drive connection; and means operative to reduce the quantity of liquid in said coupling at high engine speeds.

3. In combination with an engine; a pump operable to remove oil from said engine; an energy storing flywheel, means providing a driving connection from said engine to said flywheel, said means including a transmission unit providing a step-up speed ratio drive from said engine to said flywheel; and means drivably connecting said pump to the engine side of said transmission unit so that said transmission unit provides a step-down speed ratio driving connection from said flywheel to said pump; the driving connection between said engine and flywheel including a one-way clutch arranged so that said flywheel can drive said pump without also driving said engine.

4. In combination with an engine; a pump operable to remove oil from said engine; an energy storing flywheel, means providing a driving connection from said engine to said flywheel, said means including a transmission unit providing a step-up speed ratio drive from said engine to said flywheel; means drivably connecting said pump to the engine side of said transmission unit so that said transmission unit provides a step-down speed ratio driving connection from said flywheel to said pump; the driving connection between said engine and flywheel including a one-way clutch arranged so that said flywheel can drive said pump without also driving said engine; a controllable coupling in the driving connection between said engine and flywheel; and means for automatically effecting at least partial disengagement of said coupling at high engine speeds.

DAVID W. BERRY.

REFERENCES CITED

The following references are of record in the file of this patent:

UNITED STATES PATENTS

| Number | Name | Date |
| --- | --- | --- |
| 2,393,833 | Steiner | Jan. 29, 1946 |
| 2,402,467 | Thompson | June 18, 1946 |